E. BENDER.
FOWL CATCHER.
APPLICATION FILED AUG. 2, 1916.
1,231,116.
Patented June 26, 1917.
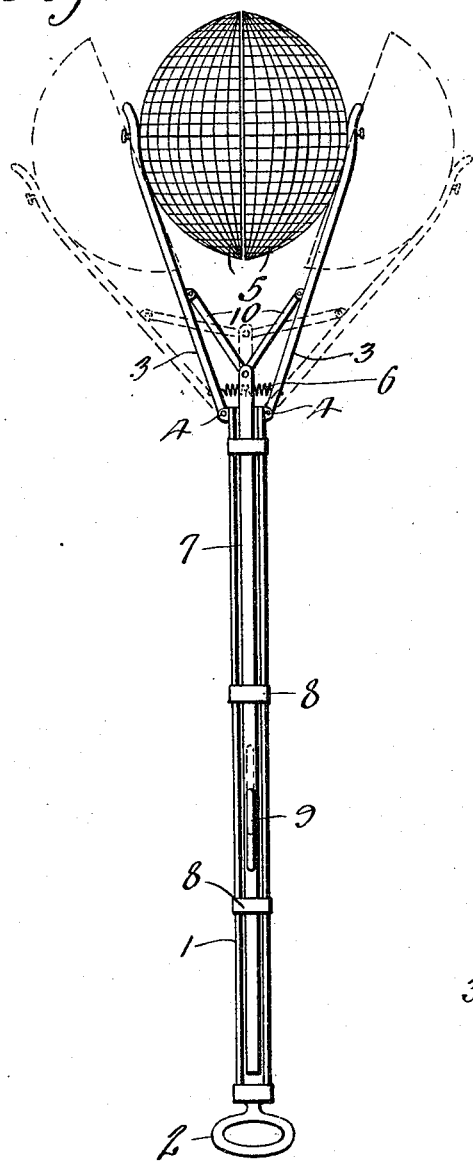
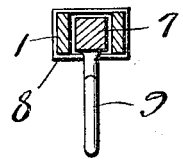
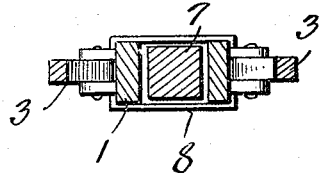

UNITED STATES PATENT OFFICE.

EDWARD BENDER, OF WESTFIELD, WISCONSIN.

FOWL-CATCHER.

1,231,116.   Specification of Letters Patent.   Patented June 26, 1917.

Application filed August 2, 1916. Serial No. 112,871.

*To all whom it may concern:*

Be it known that I, EDWARD BENDER, a citizen of the United States, residing at Westfield, in the county of Marquette and State of Wisconsin, have invented new and useful Improvements in Fowl-Catchers, of which the following is a specification.

This invention is an improved device for use in catching poultry, picking fruit, and the like, the object of the invention being to provide an improved device of this character which is simple in construction, is strong and durable and which may be readily operated.

The invention consists in the features of construction, combination, and arrangement of devices, hereinafter fully described and claimed.

In the accompanying drawings:—

Figure 1 is an elevation of a poultry catcher, constructed in accordance with my invention and showing the jaws closed in full lines and in open position in dotted lines.

Figs. 2 and 3 are detail sectional views of the same.

In the embodiment of my invention, I provide a handle bar 1 of suitable length which has a grip 2 at its outer end. The handle bar is composed of a pair of members 1ª which are arranged in spaced relation to each other. A pair of arms 3 are pivotally connected as at 4 to opposite sides of the inner end of the handle and are thereby adapted to be moved toward and from each other. Jaw or gage members 5 are attached, one to each of the arms 3 and are here shown as made of wire mesh and as substantially semi-spherical in form. A spring 6 connects the arms together and serves to normally close the two jaws or trap members together. An operating rod 7 is mounted between the members of the handle 1 for longitudinal movement and guides 8 which are here shown as strap irons are provided for said operating rod and connect the handle members together. On one side of the operating rod is a handle 9. A pair of links 10 are pivotally connected to the inner end of the operating rod and each link is pivotally connected to one of the arms 3.

By moving the rod 7 by means of its handle 9 in one direction, the trap or jaw members may be opened against the tension of the spring 6. The device may be readily manipulated to catch fowls, pick fruit, lift potatoes or do other like work, as will be understood.

Having described the invention, what is claimed is:

The herein described fowl catcher comprising a handle having a grip at the outer end, said handle comprising a pair of spaced longitudinal members and spaced cross guides connecting said members together, an operating rod slidably mounted in the handle, between the members thereof and provided at one side with a grip arranged between two of said cross guides, a pair of arms pivotally connected to the inner ends of the handle members and arranged for movement toward and from each other, a pair of substantially semi-spherical trap members on the inner sides of said arms and attached to the outer ends thereof and adapted to close together, a coiled spring connecting said arms together and a pair of links pivotally connected to the inner end of the operating rod and respectively pivotally connected to said arms.

In testimony whereof I affix my signature.

EDWARD BENDER.

Copies of this patent may be obtained for five cents each, by addressing the "Commissioner of Patents, Washington, D. C."